(12) United States Patent
Tonetti et al.

(10) Patent No.: US 8,036,813 B2
(45) Date of Patent: Oct. 11, 2011

(54) EGR CONTROL SYSTEM

(75) Inventors: Marco Tonetti, Orbassano (IT); Enrico Lanfranco, Orbassano (IT)

(73) Assignee: C.R.F. Societa Consortile per Azioni, Turin (IT)

(*) Notice: Subject to any disclaimer, the term of this patent is extended or adjusted under 35 U.S.C. 154(b) by 483 days.

(21) Appl. No.: 12/362,711

(22) Filed: Jan. 30, 2009

(65) Prior Publication Data

US 2009/0205617 A1 Aug. 20, 2009

(30) Foreign Application Priority Data

Feb. 19, 2008 (EP) .................................... 08425101

(51) Int. Cl.
*F02M 25/07* (2006.01)
*F02B 47/08* (2006.01)
*F02B 33/44* (2006.01)
*G06F 19/00* (2006.01)
*F01L 1/34* (2006.01)

(52) U.S. Cl. .............. 701/108; 123/568.14; 123/568.21; 60/605.2

(58) Field of Classification Search ............... 123/90.11, 123/90.15–90.18, 563, 568.11, 568.13, 568.14, 123/568.21; 701/101–103, 108, 114, 115; 60/599, 605.2
See application file for complete search history.

(56) References Cited

U.S. PATENT DOCUMENTS

| | | | |
|---|---|---|---|
| 6,601,387 B2 * | 8/2003 | Zurawski et al. | 60/605.2 |
| 2008/0022677 A1 | 1/2008 | Barbe et al. | |
| 2008/0078176 A1 * | 4/2008 | de Ojeda | 60/605.2 |
| 2011/0079008 A1 * | 4/2011 | de Ojeda | 60/602 |

FOREIGN PATENT DOCUMENTS

| | | |
|---|---|---|
| DE | 10 2005 015609 | 10/2006 |
| DE | 10 2005 026503 | 12/2006 |
| EP | 1 273 660 | 1/2003 |
| EP | 1 589 213 | 10/2005 |
| EP | 1 701 022 | 9/2006 |
| FR | 2 903 735 | 1/2008 |
| JP | 11264536 A * | 9/1999 |

OTHER PUBLICATIONS

European Search Report for EP 08425101 completed Aug. 8, 2008.

* cited by examiner

*Primary Examiner* — Willis Wolfe, Jr.
(74) *Attorney, Agent, or Firm* — Nixon & Vanderhye P.C.

(57) ABSTRACT

In an internal-combustion engine with exhaust-gas-recirculation system, electronic control means are provided designed to process an analytical model of the quantities "effective lambda" and "effective EGR percentage", which is constructed on the basis of the physical laws that regulate the fluid-dynamic conditions in the intake pipe, in the exhaust pipe, and in the recirculation pipe of the engine. On the basis of the deviation between the values of said quantities estimated by the model and the reference values of said quantities associated to the conditions of operation of the engine, an operation of correction on the control of the valve that governs the recirculation circuit is implemented.

24 Claims, 6 Drawing Sheets

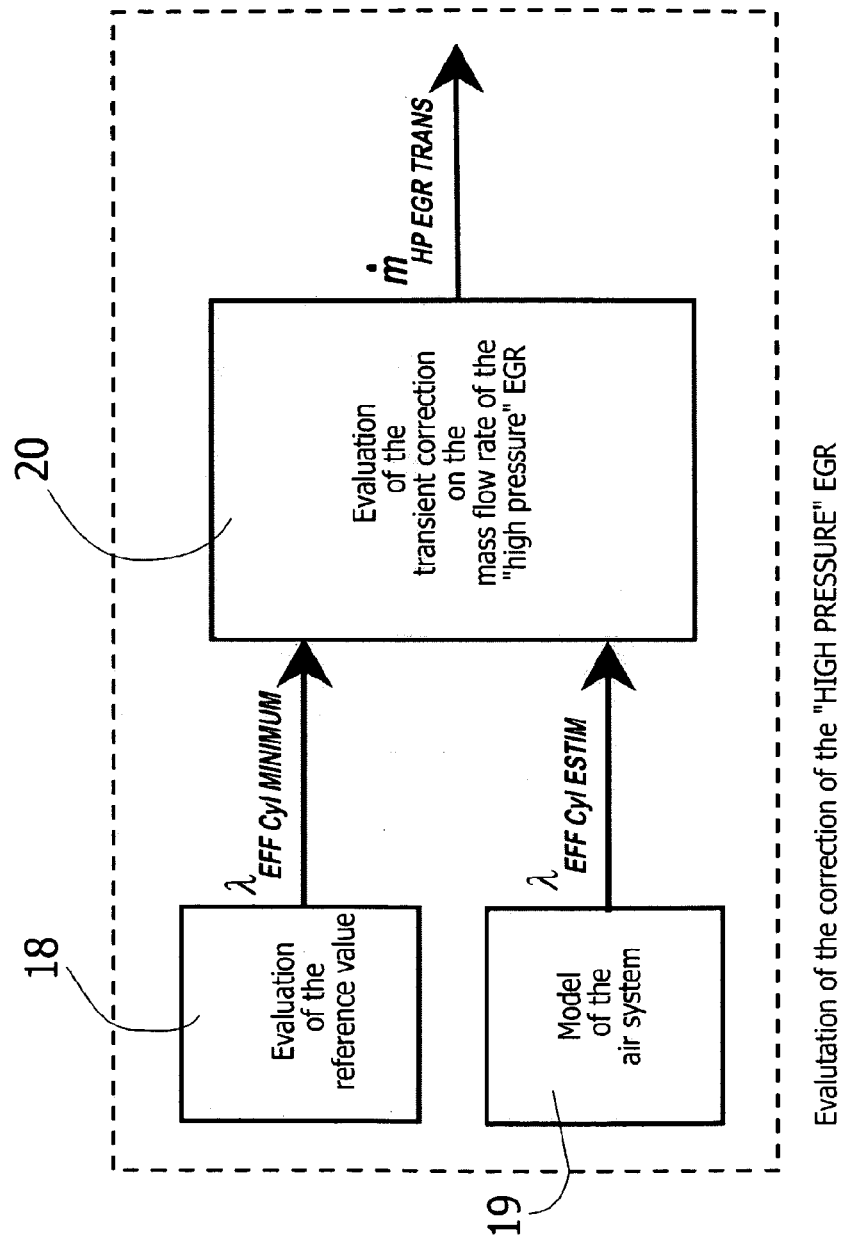

EGR CONTROL SYSTEM

CROSS REFERENCE TO RELATED APPLICATION

This application claims the benefit of European Application No. 08425101.6 filed on Feb. 19, 2008, incorporated herein by reference in its entirety.

The present invention relates to an internal-combustion engine of the type comprising:
- a main air pipe;
- an intake pipe downstream of said main pipe, which can be traversed by a gaseous mass greater than the amount that traverses said main pipe;
- at least one cylinder with at least one intake valve and at least one exhaust valve, which control, respectively, said intake pipe and an exhaust pipe;
- at least one recirculation pipe for exhaust-gas recirculation, controlled by a respective exhaust-gas recirculation valve, for supplying at least part of the exhaust gases that flow in the exhaust pipe again into the intake pipe, or, alternatively means for obtaining recirculation of the exhaust gases directly within the combustion chamber of the cylinder, with the aid of a system for variable actuation of the valves;
- a sensor of the airflow rate traversing said main pipe;
- first sensor means for detecting the operating conditions of the engine;
- second sensor means for detecting fluid-dynamic conditions in said intake and exhaust pipes;
- electronic control means designed to control said recirculation valve of said at least one recirculation pipe, or else said system for variable actuation of the valves, via an output signal, said electronic control means comprising a control block designed to process a first signal indicating the mass flow rate of recirculating exhaust gases in said at least one recirculation pipe, or else directly within the combustion chamber of the cylinder, on the basis of said sensor of the airflow rate traversing said main pipe and of said first sensor means.

An internal-combustion engine of the type comprising an exhaust-gas-recirculation system (EGR) including both a "high-pressure" EGR circuit, where the recirculated gases are taken immediately downstream of the exhaust manifold and re-introduced immediately upstream of the intake manifold, and a "low-pressure" EGR circuit, where the recirculated gases are taken downstream of the turbine (where present) and of the devices for treating the exhaust gases (catalytic converter and particulate trap) is described in the patent document No. EP 1 589 213 A1, filed in the name of the present applicant. From said document it is also known to provide, as an alternative to the high-pressure EGR circuit, an EGR inside the combustion chamber, obtained by means of a system for variable actuation of the engine valves. Said "internal" EGR system is on the other hand in itself known also from EP 1 273 770 A2, once again filed in the name of the present applicant.

FIG. 1 illustrates a first example of an internal-combustion engine of the type indicated above, which envisages a recirculation system made up of two recirculation pipes: a high-pressure pipe and a low-pressure pipe.

In detail, the engine illustrated in FIG. 1, and designated by the reference number 1, comprises a main air pipe 2, on which there are typically installed an air filter 3, and downstream of this, a mass-airflow-rate sensor 4. Said main air pipe 2 can moreover be equipped with a throttle valve 5, usually set downstream of said air filter 3 and of said flow-rate sensor 4.

The main air pipe 2 is connected to an intake pipe 2a, in which typically are interposed a compressor 6 and a device 7 for thermal conditioning of the gaseous mass circulating in the intake pipe 2a.

The intake pipe 2a communicates with the engine cylinders, designated by the reference number 6, in particular through the intake valves (not illustrated) of the engine. The exhaust openings (not illustrated) of the cylinders 8 are connected to an exhaust pipe 9, in which there is typically interposed a turbine 10 and which is likewise intercepted by a device 11 for treating the exhaust gases, which comprises, for example, a catalytic converter, and downstream of this, in succession, an anti-particulate filter 12 and a silencer 13.

As mentioned previously, the engine 1 comprises a high-pressure recirculation pipe 14, which branches off upstream from a point of the exhaust pipe 9 comprised between the internal-combustion engine 8 and the turbine 10 and is connected downstream to the intake pipe 2a in a point set between the cooling device 7 and the cylinders 8. In operation, the circulating flow within the recirculation pipe 14 is controlled by a recirculation valve 15.

The system of FIG. 1 moreover comprises a low-pressure recirculation pipe designated by the reference number 16, which branches off upstream from the exhaust pipe 9 at a point comprised between the filter 12 and the silencer 13 and converges downstream at the point of connection between the main air pipe 2 and the intake pipe 2a.

The engine described above is known from the European patent No. EP 1 589 213 B, cited previously. As described in detail in said document, the exhaust-gas-recirculation (EGR) system with which it is provided aims at guaranteeing a precise and effective control of the conditions of the recirculating exhaust gases on the basis of the regulation of the operations of both the high-pressure circuit and the low-pressure circuit.

In fact, in the recirculation system identified above there is established a given distribution between the flow of the exhaust gases of the high-pressure pipe and that of the low-pressure pipe, which, respectively, present with relatively high and relatively low temperature values in order to regulate precisely the rate and the temperature of the global flow of exhaust gases to be taken back to the cylinders.

Further advantages of an exhaust-gas-recirculation system that combines high-pressure and low-pressure recirculation pipes are extensively described in the European patent referred to above, filed in the name of the present applicant.

Once again with reference to an exhaust-gas recirculation system that combines high-pressure and low-pressure flows of exhaust gases, in combination with a low-pressure recirculation circuit, it is possible to provide the engine with an internal system for recirculation of the exhaust gases, according to what is described in the prior European patent application No. EP 1 273 770 A2, filed in the name of the present applicant. Said alternative is schematically illustrated in FIG. 2. In particular, illustrated in the European patent application No. EP 1 273 770 A2 is an engine provided with a system for variable actuation of the valves of an engine (which, in the framework of the present invention, can be applied to the intake valves or else to the exhaust valves or to both). In said known system, the engine valves are governed by the respective cams of the camshaft of the engine via interposition of a pressurized fluid chamber that can be set in exhaust by means of a solenoid valve controlled by an electronic control unit. When the pressurized fluid chamber is set in exhaust, the respective valve returns rapidly to its closing condition, also in the case where the control cam would tend to keep it open. By exploiting said arrangement, it is thus possible to vary as desired the phasing of opening and closing of the engine valves, according to any desired law. In particular, the European patent application mentioned above envisages the possibility of programming electronic control means of the system so as to keep, in certain steps of the cycle of operation of the engine, the intake valves and the exhaust valves simultaneously open to obtain an internal recirculation of the exhaust gases. According to this proposal, during the normal step of exhaust of a cylinder, part of the exhaust gases returns into the intake pipe, instead of into the exhaust pipe, and is then again introduced into the combustion chamber in the subsequent intake phase. The same effect of internal recirculation can be obtained during the normal intake phase of a cylinder, using the same principle of opening simultaneous of intake and exhaust valves. In both of the cases mentioned above, a fraction of the burnt gases returns into the combustion chamber and takes part in the next combustion cycle.

The present invention is based upon the technique described above.

The use of a low-pressure EGR system is advantageous from the standpoint of engine performance because it enables a reduction of the temperature of the recirculated exhaust gases and hence an increase in the mass of inert gases in the combustion chamber, with beneficial effects in terms of NOx reduction. Unfortunately, the transient control of said system presents considerable complexity on account of the large volume existing between the point of regulation of the low-pressure EGR amount (valve 17) and the combustion chamber 8. The gases within said volume are subject to dynamics of transport, propagation, and accumulation during the periods of transient operation of the engine, and hence during the transient the amount recirculated to the valve 17 can be significantly different from the one present in the combustion chamber 8.

It should be noted that, since the airflow meter 4 is positioned upstream of the volume mentioned above, it is also affected by the same problems: in transient conditions the measurement of flow rate 4 does not yield reliable information in the sense that it does not reflect the value of air flow effectively available to the engine on account of the dynamics of the air within the intake and exhaust volumes.

In this connection, no solution of the known art envisages an active control of the flows of the recirculating exhaust gases during the periods of transient operation of the engine.

The combination of a low-pressure recirculation circuit with a high-pressure recirculation circuit enables two important advantages to be achieved: the possibility of regulating the temperature of the charge taken in by the engine, appropriately mixing the low pressure EGR (colder) and the high-pressure EGR (hotter), and the possibility of controlling precisely the total amount of recirculated gases by appropriately acting on the high-pressure recirculation valve 15 or on an internal EGR system, obtained by means of a system for variable actuation of the engine valves. There does not, however, exist at the moment any control made by the electronic control means of the engine that is able to effect an active regulation of the recirculation system that takes into account the phenomena that arise in transient fluid-dynamic conditions in order to optimize the composition and the temperature of the gaseous mixture taken in by the engine.

Traditionally, in fact, the electronic control means of the engine govern the recirculation valve associated to a respective recirculation pipe on the basis of the conditions of operation detected on the engine, such as the amount of fuel injected and the engine r.p.m. and the airflow rate detected by the flow-rate sensor controlling the main air pipe. This type of control enables setting of the recirculation valve in an operating condition corresponding to the aforesaid conditions of operation of the engine, whereby, in steady-state conditions, the valve may effectively regulate the EGR flow rate, which is fixed as reference flow rate for the given point of operation of the engine.

However, during the transient periods of the engine, in which it passes from a first point to a second point of operation, there occurs a deviation of the effectively recirculated flow rate of the exhaust gases to the inlet of the combustion chamber with respect to the reference one, owing, in particular, to the time of response of the actuators, the transport delays, and the phenomena of accumulation of the gaseous masses, which typically are set up at points corresponding to processes of increase or else of decrease of the value of mass flow rate or percentage of a circulating flow.

The object of the present invention is to overcome the aforesaid disadvantages by providing an internal combustion engine equipped with a control system that will take into account the fluid-dynamic conditions within the engine during the transient dynamics that arise therein and that is aimed at an active control of the latter in the EGR system.

The above target is achieved by providing an internal-combustion engine according to claim 1.

The present invention envisages in particular that the electronic control means will process a fluid-dynamic model of the engine system that will be used as "virtual" sensor of the most significant quantities representing operations of the EGR system.

Said quantities are, for example, the flow rate of residual air and the flow rate of burnt gases within each pipe of the intake and exhaust systems of the engine, the "effective EGR percentage" within said pipes and the cylinder, and the value of "effective lambda" at the cylinder. Said quantities will be described in detail in what follows.

The control system referred to above envisages a control algorithm, which compares the reference values of said quantities with the values estimated by the aforesaid analytical model. The reference values are evaluated by the electronic control means according to the point of operation of the engine, for steady-state fluid-dynamic conditions within the engine system.

The provision of said analytical model acting as "virtual" sensor makes it possible to estimate the conditions effectively present in the various pipes constituting the intake and exhaust systems of the engine, and in particular in the combustion chamber of the cylinders, for example in terms of the quantities "effective EGR percentage" and "effective lambda", and thus to make up for effects deriving from the onset of transient phenomena by carrying out an appropriate regulation of the high-pressure (i.e., internal) exhaust-gas-recirculation system that will appropriately correct the reference regulation attributed to a given point of operation of the engine.

A preferred embodiment of the present invention envisages an internal-combustion engine provided with an exhaust-gas-recirculation system made up of a high-pressure recirculation circuit and a low-pressure recirculation circuit, as indicated previously for the examples of FIGS. 1 and 2. Preferably, the application of the control system referred to above in such a type of internal-combustion engine envisages processing the analytical model indicated above for the purpose of controlling the deviations in the values of the aforesaid quantities with reference to the transient phenomena that are set up in the high-pressure and low-pressure circuits so that, in the estimation of the real values of said quantities, said transient phenomena will be effectively taken into account, and an appropriate correction will be made on the control to be attributed to the recirculation valve of the high-pressure circuit, which is determined on the basis of the steady-state reference conditions. Said correction also envisages a co-ordination with the operations for control of the low-pressure exhaust-gas recirculation circuit so as to prevent the controls of the two systems from interfering with one another.

BRIEF DESCRIPTION OF THE DRAWINGS

The invention will now be described with reference to the annexed plates of drawings, which are provided purely by way of non-limiting example and in which:

FIG. 4 represents an example of a detail of the system for controlling the engine according to the present invention;

DETAILED DESCRIPTION OF THE INVENTION

Figure 1:
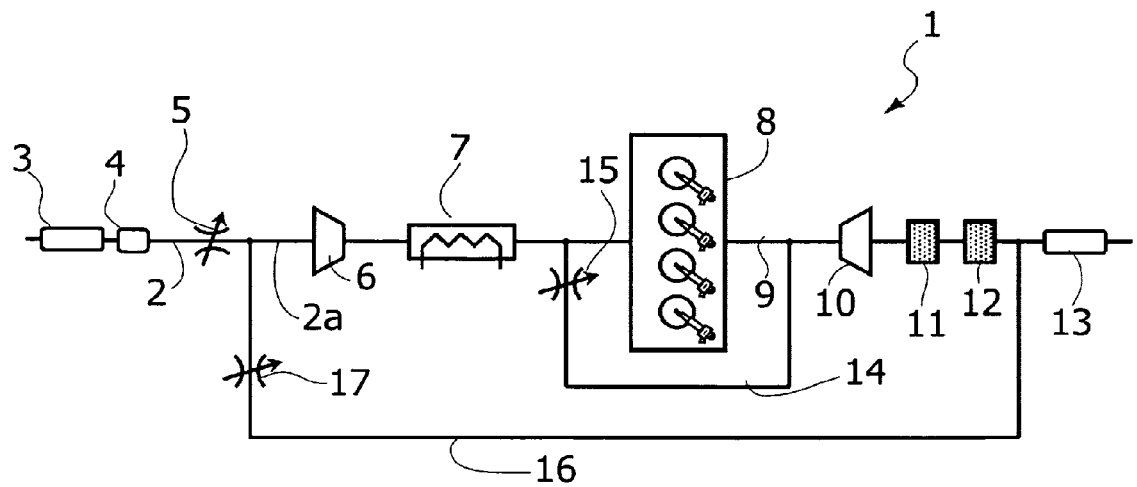
FIGS. 1 and 2 represent two examples of an internal-combustion engine with four cylinders and an electronic-injection system, of the common-rail type.
Figure 2:
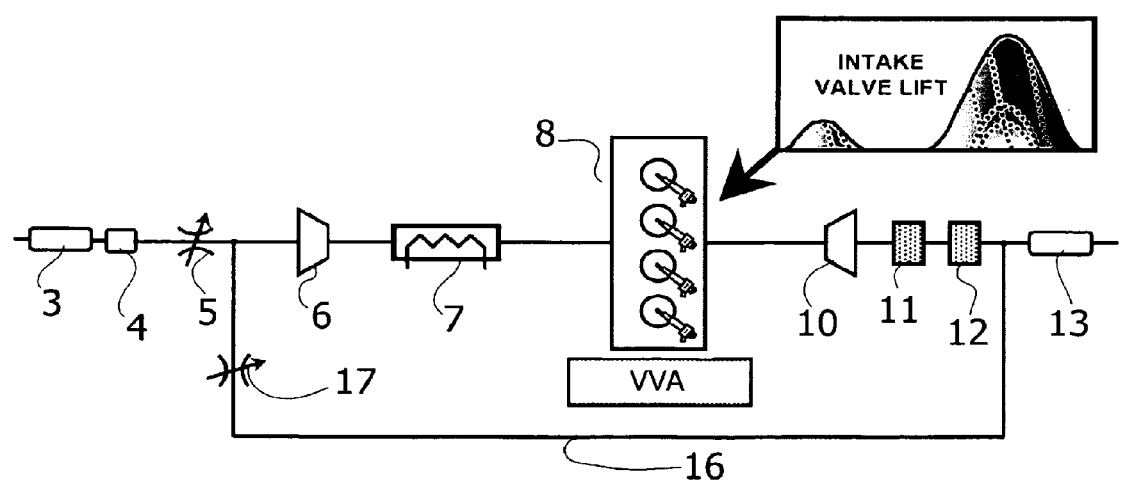

With reference to an internal-combustion engine of the type for example illustrated in FIGS. 1 and 2, the quantities "effective EGR percentage" and "effective lambda" are of particular interest for the control of the conditions of operation of the engine influenced by the operations of the EGR system.

Figure 7:
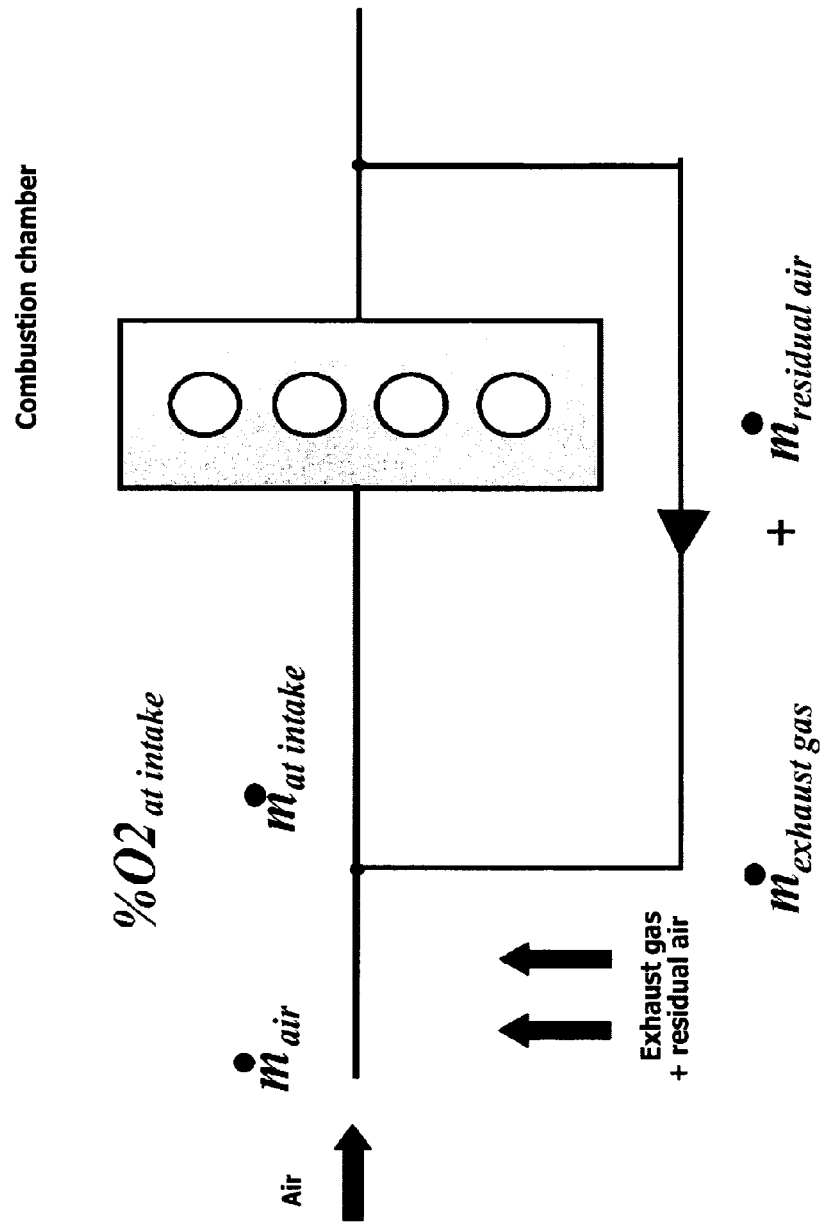
FIG. 7 represents a hydraulic scheme of an internal-combustion engine.

The "effective EGR percentages" is defined as the ratio expressed in percentage terms between the mass flow rate of recirculated burnt gases purified from the recirculated residual air and the mass flow rate at intake into the cylinders. The quantity "effective lambda" correlates, instead, the amount of air effectively taken into the cylinders, including the recirculated residual air, with the amount of fuel injected into the cylinders themselves. Given hereinafter are the analytical formulae of the aforesaid quantities, and appearing in FIG. 7 are the variables contained in said formulae.

For each of said quantities, according to methodologies in themselves known in the art, it is possible to establish a reference value corresponding to each of the conditions reached in the engine in conditions of normal operation. Said reference values are determined on the basis of the information available in the engine electronic control unit, amongst which there may be mentioned purely by way of non-limiting example: the conditions of operation detected on the engine (point of operation of the engine) such as the amount of fuel injected and the engine r.p.m., the temperature of the engine coolant, the conditions of temperature and pressure of the air taken into the main pipe 2, the conditions of temperature and pressure at the intake valves of the cylinders 8, the reference values of temperature and pressure at the intake valves of the cylinders 8, and the reference value of the airflow rate inside the main pipe (measurement point 4 in FIGS. 1 and 2).

Figure 3:
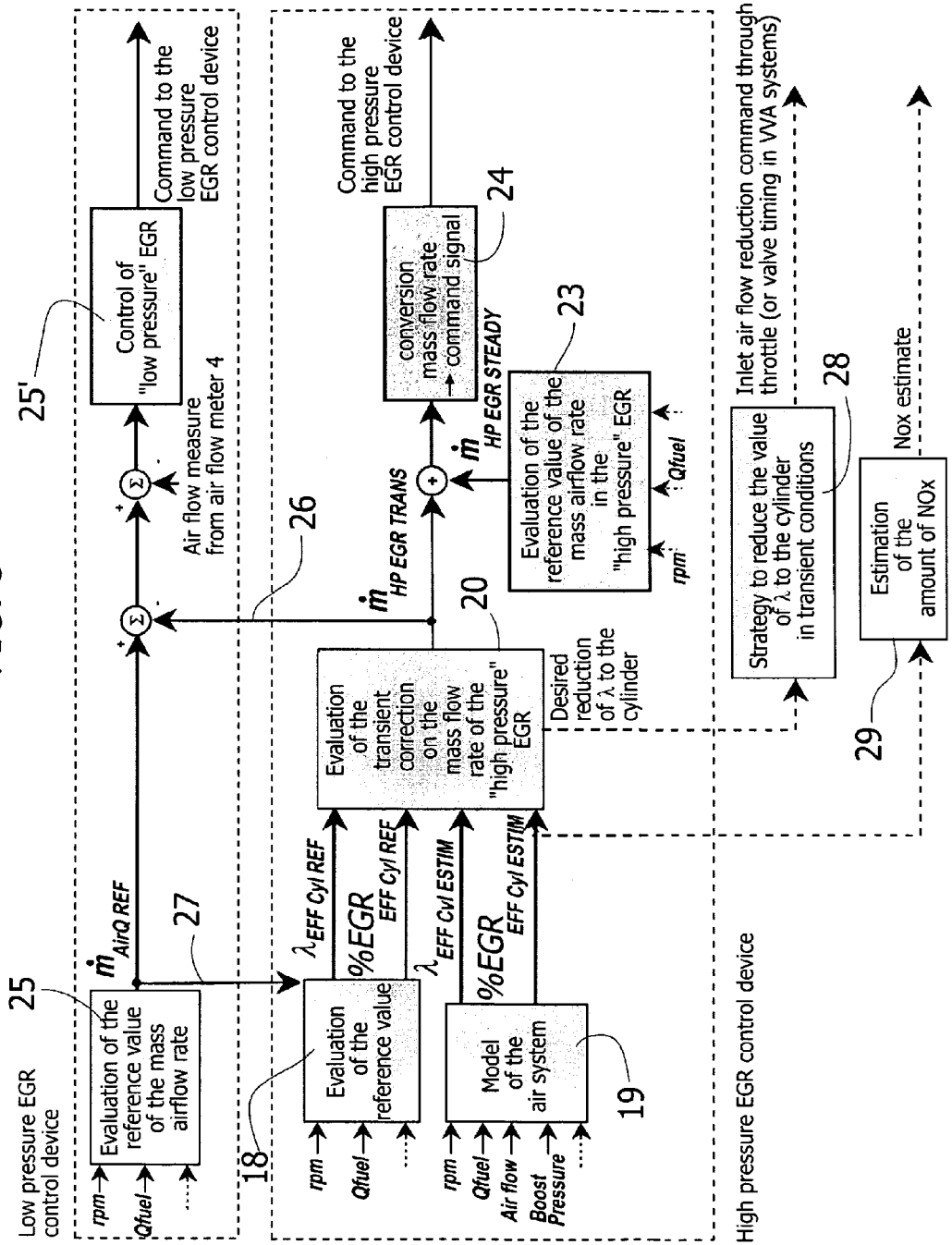
FIG. 3 represents a system for controlling the engine according to the present invention in which the engine is equipped with a dual-circuit exhaust-gas recirculation system.

FIG. 3 is a schematic illustration of a control strategy that is adopted by the electronic control means of an internal-combustion engine according to the present invention, for a type of engine like the one represented in FIGS. 1 and 2.

Illustrated in particular in FIG. 3 are two different control systems, the top one of which represents the control system acting on the low-pressure circuit of the EGR system, whilst the bottom one represents the system acting in a point corresponding to the high-pressure circuit.

Considering now the system for controlling the high pressure exhaust-gas recirculation circuit, the electronic control means comprise a first control block 18 and a second control block 19. As may be seen in FIG. 3, the first control block 18 receives at input all the signals necessary for determination of the reference quantities chosen, for example the engine r.p.m., the amount of fuel injected into the cylinders, and more in general all the information available within the engine electronic control unit. Said control block 18 is designed to identify the reference values of the quantities mentioned above, indicating the operating conditions in the cylinders, which typically correspond to the values desired in the engine itself in steady-state fluid-dynamic conditions. In the example represented in FIG. 3, said quantities are the "effective lambda" and the "effective EGR percentage" in the combustion chamber.

The second control block 19 is, instead, designed to estimate the current value of the quantities indicated above that is determined at a point corresponding to transient fluid-dynamic conditions in the engine. In other words, the control block 19 determines an estimate of the values assumed by the quantities such as the "effective lambda" at the cylinders and the "effective EGR percentage" at the cylinders.

Said values are determined on the basis of a fluid-dynamic model of the engine system that is processed by the electronic control means of the engine according to the present invention. Said model, according to the precision of representation of the fluid-dynamic conditions in the engine system that is sought, can consider the fluid-dynamic conditions inside all or some of the following: the main air pipe, the intake pipe, the exhaust pipe, and the high-pressure and low-pressure EGR pipes.

This model is designed to represent the fluid-dynamic conditions within the system considered in order to estimate the composition and the temperature of the gaseous mixture in the various pipes of the air system, and in particular the flow rate of air and burnt gases, the "effective EGR percentages" and the "effective lambda" at the cylinders. Said model in general uses all the information available within the engine electronic control unit, in particular information of the type regarding the engine r.p.m. and the amount of fuel injected in order to determine the point of operation of the engine itself, and likewise information obtained from sensors (amongst which, for example, temperature, pressure and flow-rate sensors) installed in given positions in the engine system, for example, in the intake and exhaust pipes, in the air pipe, and in the exhaust-gas recirculation pipes.

This model has the function of "virtual" sensor for estimation of the quantities that are not measured or measurable directly, and is processed on the basis of the physical laws that govern the dynamics of gas flow within pipes, which are in themselves already known and that will thus not be described in detail herein.

With reference once again to FIG. 3, the values determined by the control blocks 18 and 19 are transmitted to a correction block 20. This control or correction block 20 compares the estimated quantities coming from block 19 with the reference quantities determined by block 18 in order to determine the deviation between said quantities and carry out an operation of correction.

The deviation here considered may derive, as has already been said, from the transient fluid-dynamic conditions that are set up in the engine system at a point corresponding to a variation of the conditions of operation of the latter, for which transport delays and phenomena of accumulation of the gaseous masses are, for example, set up.

Figure 4A:
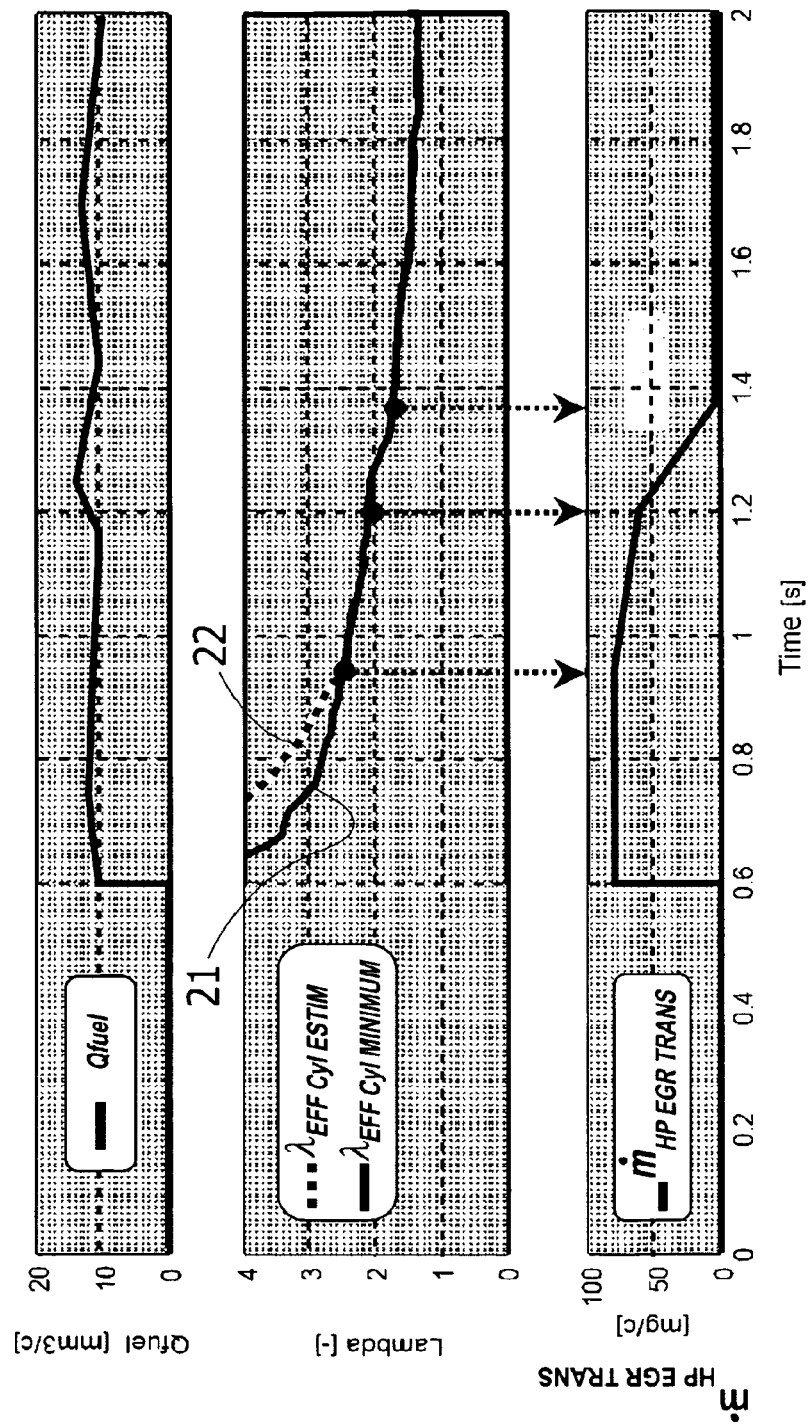
FIG. 4a represents diagrams illustrating a possible mode of operation of the system for controlling the engine according to the present invention, provided purely by way of non-limiting example.

FIGS. 4 and 4a show an example of embodiment of the transient control described above, applied to the quantity "cylinder effective lambda". Represented in FIG. 4 are the control blocks 18 and 19 and the correction block 20.

The control block 18 determines the reference value of "cylinder effective lambda" for a given running condition of the engine. In this connection, FIG. 4a illustrates a diagram of the amount of fuel injected into the cylinders during a given working period of the engine. In the manoeuvre, illustrated by way of example, at the instant 0.6 s, the engine envisages a variation of the conditions of operation from a condition in which the amount of fuel injected is equal to zero to an operating condition in which the amount of fuel injected is 10 $mm^3$/injection.

With respect to said situation the control block 18 calculates the reference profile of "cylinder effective lambda" corresponding to the diagram, referred to above, of the amount of fuel injected. The diagram at the centre of FIG. 4a is the diagram of the reference "cylinder effective lambda", designated by the number 21, which is generated by the control block 18.

The manoeuvre illustrated in FIG. 4a is significant of a typical transient of the engine operating point, for example due to a gear change with release of the accelerator pedal and subsequent pressure applied thereon.

The control block 19 is designed, instead, to determine an estimate of the effective value of "cylinder effective lambda" that is set up in the combustion chamber 8, taking into account the transient dynamics of the conditions of the gas flows that occurs in the engine system in a point corresponding to the variation of the conditions of operation of the latter referred to above. These values of "cylinder effective lambda" are obtained thanks to the model of the engine system that is processed by the control block 19. For example, as has already been said, the model that is processed can represent the engine system formed by the intake pipes, the air pipes, and the high-pressure and low-pressure exhaust-gas recirculation pipes.

The plot of the values of "effective lambda" estimated by block 19 is presented in the diagram at the centre of FIG. 4a with the reference number 22. In the example of FIG. 4a, it may be noted that the estimated transient value of the quantity "cylinder effective lambda" is higher than the corresponding reference value, denoting that the amount of air available in the combustion chamber is excessive. This deviation can be compensated for by dynamic correction of the amount of gases recirculated by the high-pressure recirculation system.

The correction block 20 evaluates the difference between the values of "cylinder effective lambda" determined by blocks 18 and 19. Said difference between the aforesaid values determines precisely the activation of the correction block 20, which acts by making a transient correction on the command transmitted to the high-pressure recirculation valve 15, as will be described in what follows.

Said correction aims at a fast reduction in the difference between the reference value of "cylinder effective lambda" and the estimated value of "cylinder effective lambda" by acting on the high-pressure recirculation system. With particular reference to the diagram at the centre of FIG. 4a, it may be noted that the estimated values of "cylinder effective lambda" are higher than the reference values of "cylinder effective lambda". This means that in the transient phase that is set up starting from the variation of amount of fuel injected into the cylinders (represented at the top of FIG. 4a), an excess of oxygen is determined in the combustion chamber with respect to the reference condition evaluated by the control block 18, with adverse effects on the pollutant emissions of the engine itself.

Given this situation, the correction block 20 acts in such a way as to determine a corrective mass flow rate $m_{HP\ EGR\ TRANS}$ of recirculating exhaust gases, to be added to the corresponding mass flow rate required in conditions of steady-state operation $m_{HP\ EGR\ STEADY}$ in order to correct the difference indicated above between the reference values and estimated values of "cylinder effective lambda".

As will be specified better in what follows, this corrective flow rate corresponds to a further flow rate of the exhaust gases recirculating in the high-pressure EGR system, which is added to the reference one corresponding to the new running condition of the engine, which in this case envisages an amount of fuel injected of approximately 10 $mm^3$ for each injection. As may be seen at the bottom of FIG. 4a, this compensation strategy, performed by the correction block 20, generates a corrective flow rate that depends upon the deviation between the reference values and estimated values of "cylinder effective lambda", and consequently said transient correction goes to zero when the estimated amounts converge to the respective reference value.

To return once again to FIG. 3 of the correction block 20, according to what has been described above, a corrective mass flow rate $m_{HP\ EGR\ TRANS}$ of the recirculation exhaust gases in the high-pressure EGR system is processed.

As has also already been mentioned previously, this value of corrective mass flow rate is added to the value of mass flow rate of the recirculation exhaust gases determined for steady-state reference conditions within the engine system. The value of mass flow rate in steady-state conditions is calculated by block 23 of FIG. 3, which calculates said value on the basis of the information available within the engine electronic control unit, in particular typically from the conditions of operation of the engine, such as the engine r.p.m., the amount of fuel at input to the cylinders, the temperature of the engine coolant, and the atmospheric pressure and temperature. This value of mass flow rate in steady-state conditions basically constitutes a reference value of mass flow-rate of the exhaust gases recirculating in the high-pressure EGR system.

Finally, the strategy for controlling the high-pressure EGR circuit of the internal-combustion engine according to the present invention envisages a block 24, which is designed to convert the objective value of the mass flow rate of the recirculating exhaust gases, obtained from the sum of the corrective flow rate and the reference flow rate described above, into a command signal to be sent to the recirculation valve of the high-pressure circuit or to the device for controlling the intake and/or exhaust valves.

With reference now to the strategy for controlling the low-pressure exhaust-gas recirculation circuit, a control block 25 is provided, which is designed to determine the reference value of the mass airflow rate taken in through the main air pipe 2 in FIG. 1 on the basis of the information available within the engine electronic control unit, such as, for example, the engine r.p.m., the amount of fuel injected into the cylinders, the temperature of the coolant in the engine, and the atmospheric pressure and temperature.

In particular, a closed-loop control is provided (block 25'), which regulates the aforesaid low-pressure exhaust-gas recirculation circuit according to the amount of air measured by the decimeter in a point corresponding to the main air pipe in order to take the necessary global amount of air into the cylinders.

The transient correction generated by the correction block 20 on the device for controlling the high-pressure circuit also necessarily affects the fluid-dynamic conditions that can be detected within the low-pressure circuit, and in particular, with reference to FIGS. 1 and 2, the measurement of airflow rate 4 in the main air pipe 2. However, it is necessary for the system for controlling the low-pressure circuit not to be affected by the corrective mass flow rate evaluated for the high-pressure recirculation circuit. There is then envisaged a compensation operation, designated as a whole by the reference number 26 that will modify the reference value used for the closed-loop control of the low-pressure exhaust-gas recirculation circuit. FIG. 3 illustrates a possible embodiment of the compensation described above, consisting in reducing the airflow-rate reference in the main air pipe 2 by a value equal to or in any case proportional to the same value of corrective flow rate calculated for the high-pressure EGR circuit. This arrangement is adopted to prevent the system for controlling the low-pressure recirculation from reacting in an improper way in the presence of a transient correction on the high-pressure recirculation system.

The system for controlling the two recirculation circuits envisages a co-ordination of the operations within the two circuits according to schemes of co-ordination already implemented in the art. Said co-ordination in the control between the two circuits is represented schematically by the arrow 27, which represents the transmission to the control block 18 of the high-pressure circuit of the mass flow-rate reference value in the main air pipe 2, calculated by the control block 25 of the low-pressure circuit. Basically, the reference flow rate in the main air pipe 2, together with the information available in the engine electronic control unit and the conditions of operation of the engine, enables definition of the reference values at output from the control block 18, such as for example the "effective EGR percentage" and the "effective lambda" in the combustion chamber.

Figure 5:
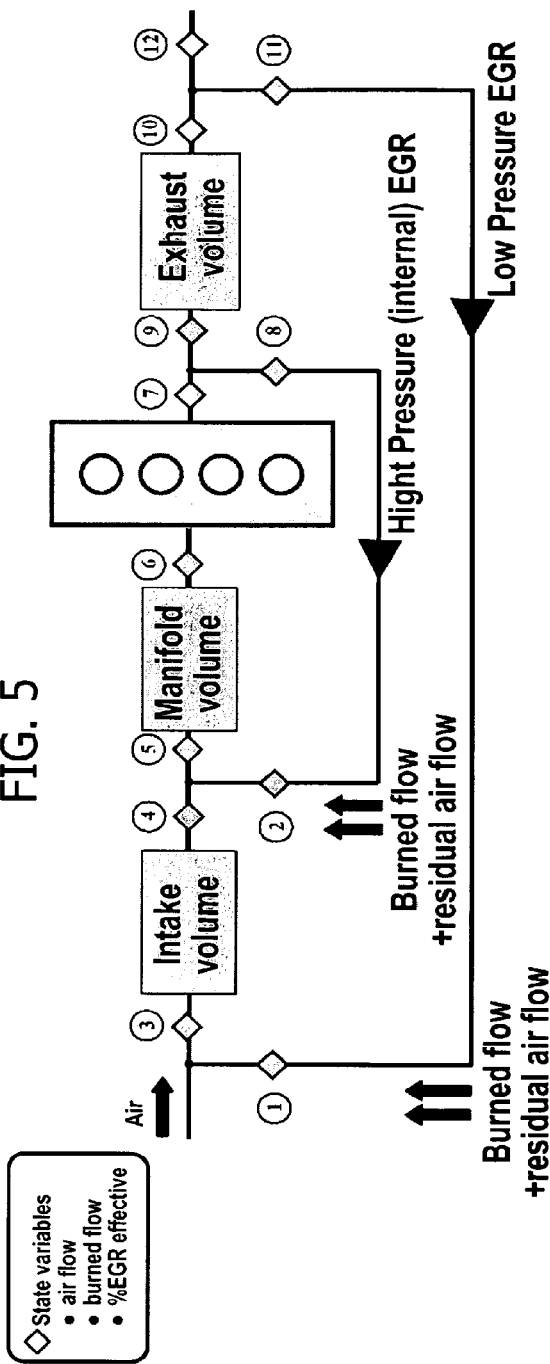
FIG. 5 is a schematic illustration of a possible embodiment of the fluid-dynamic model of the engine system used for estimation of the most significant quantities representing the operations of the exhaust-gas-recirculation system according to the present invention.

FIG. 5 illustrates an embodiment of the fluid-dynamic model of the engine system according to the present invention, in which both of the recirculation circuits are schematically represented. The high-pressure EGR circuit can be possibly replaced by means suitable for obtaining the recirculation of the exhaust gases directly within the combustion chamber of the cylinder, with the aid of a system for variable actuation of the engine valves. Processing of the fluid-dynamic model referred to above enables estimation of the most significant quantities within the air system, in particular the ones that are not measured or not measurable directly, and hence provision of a "virtual" sensor of the fluid-dynamic conditions within the respective pipes. Said "virtual" sensor, as extensively described previously, is based upon the measurements of the standard sensors installed in an engine system (sensors designed to detect the atmospheric pressure, the mass flow rate, and the temperature downstream of the air filter, the pressure and temperature in the intake manifold, the pressure and temperature at input to the diesel-particulate filter, the concentration of oxygen at exhaust, etc.). There may moreover be provided additional sensors, such as, for example, pressure sensors within the cylinder, linear sensors of concentration of oxygen at intake, and pressure and temperature sensors in the exhaust manifold.

From the measurements obtained from the sensors, and more in general from the information contained in the electronic control means for controlling the running conditions of the engine, the "virtual" sensor processed by the electronic control means estimate the quantities indicated previously, and in particular the airflow rate and the rate of burnt gases, the "effective EGR percentages" in the various pipes forming the air system, and finally the "effective lambda" at the cylinders.

In the example illustrated in FIG. 5, an estimate of said quantities is made in all the points represented with a rhombus in said figure.

The control system acts, then, so as to carry out for both of the recirculation circuits a corrective control of the mass flow rates of the recirculated exhaust gases.

As already mentioned previously, the use of this model or "virtual" sensor enables the transient phenomena that are set up within the engine system to be taken into account, such as in particular the transport delays and the effects of accumulation. Furthermore, since the amount of residual oxygen within the recirculated exhaust gases is also taken into account, it is possible to estimate in a precise way the values of "effective lambda" and "effective EGR percentage" and hence control precisely the composition of the mixture of air and burnt gases introduced into the combustion chamber.

To return again to FIG. 3, the control system according to the present invention moreover envisages the possible presence of a block 28, which implements a further correction to be made in transient conditions in order to restore the desired EGR level to the cylinder in the cases where the amount of burnt gases within the exhaust circuit is insufficient. Said situation can, for example, be found following upon a prolonged cut-off: in this case, the prolonged absence of injection causes evacuation of the burnt gases from the intake and exhaust system of the engine, and hence there does not exist sufficient burnt gas for recirculation. The block 28 envisages the possibility of reducing the value of $\lambda$ to the cylinder by partializing the amount of air taken in, for example by closing the throttle valve 5 (FIGS. 1 and 2), or else, in the systems for variable actuation of the engine valves, by modifying the phasing of the intake valves so as to introduce a lower flow rate of gas into the combustion chamber. This enables an increase in the fraction of burnt gas in the exhaust system and consequently in the amount of burnt gases that can be recirculated.

Figure 6:
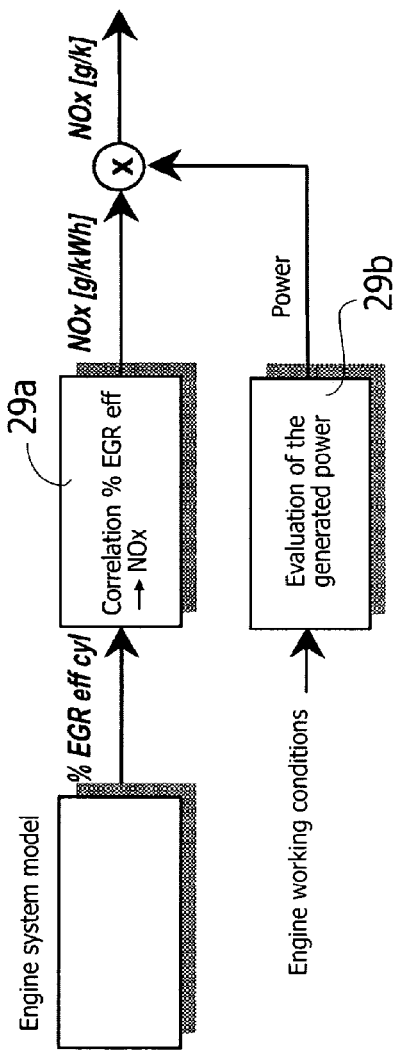
FIG. 6 represents further elements of implementation of the control system according to the present invention.

Finally, the present applicant has found, through an intense experimental activity, that there exists an experimental correlation between the amount of nitrogen oxides (NOx) produced in the cylinders and the "effective EGR percentage" in the gaseous mixture taken in by the cylinders themselves. The presence of a fluid-dynamic model of the engine system capable of estimating the "effective EGR percentage" in the combustion chamber can thus advantageously be exploited also for determining in real time the amount of NOx produced in the cylinders. In fact, since the control system described above envisages calculating in real time the "effective EGR percentage", from said value it is possible to obtain, via a correlation existing between the "effective EGR percentage" and the amount of NOx, the actual amount of the latter produced in the cylinders. The correlation between the effective EGR percentage value and the amount of NOx produced is preferably processed with respect to a unit power generated on the engine. Consequently, in order to determine the amount of NOx effectively produced, the control system according to the present invention will see to executing an algorithm, which is represented by block 29 in FIG. 3 and is illustrated in greater detail in FIG. 6, said block 29 comprising a block 29a that sets the effective EGR percentage estimated by the model of the engine system in correlation with the amount of NOx produced per unit power generated, and a block 29b, which evaluates the power effectively generated in the engine. The processed data of blocks 29a and 29b are then combined via an operation of multiplication in order to obtain the real amount of NOx produced in the engine corresponding to a given running condition of the latter.

In the case of application of the control system described above in an internal-combustion engine of the type illustrated in FIG. 2, what has been reported above applies, where by the term "recirculation valve" is meant the intake or exhaust valves of the cylinders governed by the system for variable actuation of the valves in the modalities described previously, and by the term "flow in the recirculation pipe" the recirculation of the exhaust gases directly into the combustion chamber of the cylinders.

What is claimed is:

1. An internal-combustion engine comprising:
   a main air pipe;
   an intake pipe downstream of said main pipe which can be traversed by a gaseous mass greater than the amount that traverses said main pipe;
   at least one cylinder with at least one intake valve and at least one exhaust valve, which control, respectively, said intake pipe and an exhaust pipe;
   at least one recirculation pipe for exhaust-gas recirculation, controlled by a respective exhaust-gas recirculation valve, for supplying at least part of the exhaust gases that flow in the exhaust pipe again into the intake pipe, or, alternatively, means for obtaining the recirculation of the exhaust gases directly within the combustion chamber of the cylinder, with the aid of a system for variable actuation of the valves;
   a sensor of the airflow rate traversing said main pipe;
   first sensor means for detecting the operating conditions of the engine;
   second sensor means for detecting fluid-dynamic conditions in said intake and exhaust pipes;
   electronic control means designed to control said recirculation valve of said at least one recirculation pipe, or else said system for variable actuation of the valves, via an output signal, said electronic control means comprising a control block designed to process a first signal indicating the mass flow rate of exhaust gases recirculating in said at least one recirculation pipe, or else directly within the combustion chamber of the cylinder, on the basis of the measurement of said sensor of the airflow rate traversing said main pipe and of said first sensor means;
   said engine being characterized in that said electronic control means comprise a second control block (18) designed to attribute to at least one quantity representing the conditions of the gaseous mass circulating in said intake pipe a reference value of said quantity in steady-state conditions, on the basis of the data transmitted by said first sensor means and said second sensor means,
   said electronic control means moreover comprising a third correction block designed to process an analytical model of said quantity constituted by physical laws that regulate the fluid-dynamic conditions in one or more from among said intake pipe, said exhaust pipe, and said recirculation pipe, said analytical model generating, on the basis of the data transmitted by said first sensor means, said second sensor means, and said flow-rate sensor, an estimate of the real value of said quantity, wherein said correction block envisaging an operation of correction of the deviation between said reference value and said estimated value so that a second signal is produced indicating a corrective flow rate of exhaust gases, which, added to said first signal is able to generate an output signal of said electronic means that is such as to give rise to a corrected flow rate of exhaust gases recirculating within said at least one recirculation pipe, or else directly within the combustion chamber of the cylinder, to which there correspond equal values between said reference value and said estimated value.

2. The internal-combustion engine according to claim 1, wherein said quantity represents the "effective EGR percentage" to the cylinder, defined as the ratio expressed in percentage terms between the mass flow rate of recirculated burnt gases purified from the recirculated residual air and the mass flow rate at intake into the cylinders.

3. The internal-combustion engine according to claim 1, wherein said quantity represents the "effective lambda" at the cylinder that correlates the amount of air effectively taken into the cylinders including the recirculated residual air with the amount of fuel injected into the cylinders themselves.

4. The internal-combustion engine according to claim 1, wherein said second signal is obtained on the basis of the difference between said reference value and said estimated value of said quantity.

5. The internal-combustion engine according to claim 1, wherein it comprises:
   at least one compressor interposed in said intake pipe;
   at least one turbine for controlling the aforesaid compressor, interposed in said exhaust pipe; and
   a device for treating the exhaust gases, interposed in the exhaust pipe, downstream of the turbine, and comprising catalytic-converter means and particulate-filtering means.

6. The internal-combustion engine according to claim 5, in which said means are provided for obtaining recirculation of the exhaust gases directly within the combustion chamber of the cylinder, with the aid of a system for variable actuation of the valves, characterized in that it moreover comprises a recirculation pipe for exhaust-gas recirculation, which branches off from the exhaust pipe in a point downstream of the turbine and converges in the intake pipe at a point upstream of the compressor, and that is controlled by a respective exhaust-gas recirculation valve governed by said electronic control means.

7. The internal-combustion engine according to claim 6, wherein said electronic control means comprise a further control block, designed to process a signal indicating the mass flow rate of exhaust gases recirculating in said recirculation pipe on the basis of said first sensor means, said electronic control means envisaging control of said recirculation valve of said recirculation pipe via a further output signal obtained by the subtraction from said signal indicating the mass flow rate of exhaust gases in said recirculation pipe of said signal indicating the corrective flow rate of exhaust gases.

8. The internal-combustion engine according to claim 5, wherein said at least one recirculation pipe comprises a first recirculation pipe for exhaust-gas recirculation that branches off from the exhaust pipe in a point upstream of the turbine and converges in the intake pipe in a point downstream of the compressor.

9. The internal-combustion engine according to claim 8, wherein it comprises a second recirculation pipe for exhaust-gas recirculation that branches off from the exhaust pipe in a point downstream of the turbine and converges in the intake pipe in a point upstream of the compressor and that is controlled by a second exhaust-gas recirculation valve governed by said electronic control means.

10. The internal-combustion engine according to claim 9, wherein said analytical model of said quantity is constructed on the basis of physical laws that regulate the fluid-dynamic conditions in said intake pipe, in said first recirculation pipe, and in said exhaust pipe, and said output signal of said corrected flow rate being designed to control the recirculation valve of said first recirculation pipe.

11. The internal-combustion engine according to claim 10, wherein said electronic control means comprise a further control block designed to process a signal indicating the mass flow rate of exhaust gases recirculating in said second recirculation pipe on the basis of said first sensor means, said electronic control means envisaging control of said second recirculation valve of said second recirculation pipe via a further output signal obtained by the subtraction from said signal indicating the mass flow rate of exhaust gases in said second recirculation pipe of said signal indicating the corrective flow rate of exhaust gases.

12. A method for controlling the exhaust-gas-recirculation system in an internal-combustion engine of the type comprising:
a main air pipe;
an intake pipe downstream of said main pipe which can be traversed by a gaseous mass greater than the amount that traverses said main pipe;
at least one cylinder with at least one intake valve and at least one exhaust valve that control, respectively, said intake pipe and an exhaust pipe;
at least one recirculation pipe for exhaust-gas recirculation, controlled by a respective exhaust-gas recirculation valve, for supplying at least part of the exhaust gases that flow in the exhaust pipe again into the intake pipe, or, alternatively means for obtaining the recirculation of the exhaust gases directly within the combustion chamber of the cylinder, with the aid of a system for variable actuation of the valves;
a sensor of the airflow rate traversing said main pipe;
first sensor means for detecting the operating conditions of the cylinder;
second sensor means for detecting fluid-dynamic conditions in said intake and exhaust pipes;
electronic control means designed to control said recirculation valve of said at least one recirculation pipe, or else said system for variable actuation of the valves, via an output signal,
in which the processing of a first signal is provided indicating the mass flow rate of recirculating exhaust gases in said at least one recirculation pipe, or else directly in the combustion chamber of the cylinder, on the basis of said first sensor means,
said method being characterized in that it envisages control of at least one quantity representing the conditions of the gaseous mass circulating in said intake pipe,
in which attributed to said quantity is a reference value of said quantity in steady-state conditions on the basis of the data transmitted by said first sensor means,
and in which an analytical model of said quantity is processed that is constructed on physical laws that regulate the fluid-dynamic conditions in one or more from among said intake pipe, said exhaust pipe and said recirculation pipe, said analytical model generating, on the basis of the data transmitted by said first sensor means, said second sensor means, and said flow-rate sensor, an estimate of the real value of said quantity, and in which there is envisaged an operation of correction of the deviation between said reference value and said estimated value so that:
a second signal is produced indicating a corrective mass flow rate of exhaust gases, which, added to said first signal, is able to generate an output signal that is such as to regulate a corrected flow rate of exhaust gases recirculating in said at least one recirculation pipe, or else directly in the combustion chamber of the cylinder, to which there correspond equal values between said reference value and said estimated value.

13. The method according to claim 12, wherein said quantity represents the "effective EGR percentage" to the cylinder defined as the ratio expressed in percentage terms between the mass flow rate of recirculated burnt gases purified from the recirculated residual air and the mass flow rate at intake into the cylinders.

14. The method according to claim 12, wherein said quantity represents the "effective lambda" to the cylinder that correlates the amount of air effectively taken into the cylinders, including the recirculated residual air, with the amount of fuel injected into the cylinders themselves.

15. The method according to claim 12, wherein said second signal is obtained on the basis of the difference between said reference value and said estimated value of said quantity.

16. The method according to claim 12, wherein it is applied in an engine that comprises:
a compressor interposed in said intake pipe;
a turbine for controlling the aforesaid compressor, interposed in said exhaust pipe; and
a device for treating the exhaust gases, interposed in the exhaust pipe, downstream of the turbine, and comprising catalytic-converter means and particulate-filtering means.

17. The method according to claim 16, which is applied in an engine that comprises said means for obtaining the recirculation of the exhaust gases directly within the combustion chamber of the cylinder, with the aid of a system for variable actuation of the valves, said method being characterized in that said engine moreover comprises a recirculation pipe for exhaust-gas recirculation, which branches off from the exhaust pipe in a point downstream of the turbine and converges in the intake pipe in a point upstream of the compressor, and which is controlled by a respective exhaust-gas recirculation valve governed by said electronic control means.

18. The method according to claim 17, wherein it envisages processing a signal indicating the mass flow rate of exhaust gases recirculating in said recirculation pipe on the basis of said first sensor means, said electronic control means envisaging control of said recirculation valve of said recirculation pipe via a further output signal obtained from the subtraction from said signal indicating the mass flow rate of exhaust gases in said recirculation pipe of said signal indicating the corrective flow rate of exhaust gases.

19. The method according to claim 17, wherein said electronic means simultaneously govern said system for variable actuation of the valves and said recirculation valve of said recirculation pipe.

20. The method according to claim 16, wherein it is applied in an engine in which said at least one recirculation pipe comprises a first recirculation pipe for exhaust-gas recirculation that branches off from the exhaust pipe in a point upstream of the turbine and converges in the intake pipe in a point downstream of the compressor.

21. The method according to claim 20, wherein it is applied in an engine that comprises a second recirculation pipe for exhaust-gas recirculation that branches off from the exhaust pipe in a point downstream of the turbine and converges in the intake pipe in a point upstream of the compressor, and that is controlled by a second exhaust-gas recirculation valve governed by said electronic control means.

22. The method according to claim 21, wherein said electronic means simultaneously govern the respective recirculation valves of said first and second recirculation pipes.

23. The method according to claim 21, wherein said analytical model of said quantity is constructed on the basis of physical laws that regulate the fluid-dynamic conditions in said intake pipe, in said first recirculation pipe, and in said exhaust pipe, and said output signal of said corrected flow rate being designed to control the recirculation valve of said first recirculation pipe.

24. The method according to claim 23, wherein it envisages processing a signal indicating the mass flow rate of recirculating exhaust gases in said second recirculation pipe on the basis of said first sensor means, and in that it envisages controlling said recirculation valve of said second recirculation pipe via a further output signal obtained from the subtraction from said signal indicating the mass flow rate of exhaust gases in said second recirculation pipe of said signal indicating the corrective flow rate of exhaust gases.

* * * * *